US009542349B2

United States Patent
More et al.

(10) Patent No.: US 9,542,349 B2
(45) Date of Patent: Jan. 10, 2017

(54) WIDE PORT EMULATION AT SERIAL ATTACHED SCSI EXPANDERS USING VIRTUAL PHYSICAL LINKS

(71) Applicant: LSI CORPORATION, San Jose, CA (US)

(72) Inventors: Shankar More, Pune (IN); Mandar Joshi, Pune (IN); Vidyadhar Pinglikar, Pune (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 535 days.

(21) Appl. No.: 14/096,204

(22) Filed: Dec. 4, 2013

(65) Prior Publication Data
US 2015/0154138 A1    Jun. 4, 2015

(51) Int. Cl.
G06F 13/20    (2006.01)
G06F 13/40    (2006.01)
G06F 13/38    (2006.01)

(52) U.S. Cl.
CPC ......... G06F 13/4059 (2013.01); G06F 13/385 (2013.01); G06F 13/404 (2013.01)

(58) Field of Classification Search
CPC .............. G06F 13/4059; G06F 1/0601; G06F 12/0866; G06F 3/0689
USPC ........... 710/104–110, 306–317; 711/112–113
See application file for complete search history.

(56) References Cited

U.S. PATENT DOCUMENTS

| 7,206,875 | B2 * | 4/2007 | Marushak | G06F 3/0607 710/315 |
| 7,290,066 | B2 * | 10/2007 | Voorhees | G06F 13/387 710/30 |
| 7,353,302 | B2 * | 4/2008 | Seto | G06F 13/4022 709/225 |
| 7,506,078 | B2 * | 3/2009 | Wootten | G06F 13/385 710/15 |
| 7,882,281 | B2 * | 2/2011 | Jones | G06F 13/4009 710/107 |
| 8,275,938 | B2 | 9/2012 | Nakajima | |
| 8,694,708 | B2 * | 4/2014 | Jinno | G06F 3/0605 370/254 |
| 8,868,793 | B2 * | 10/2014 | Wu | G06F 3/0685 710/3 |
| 2006/0194386 | A1 * | 8/2006 | Yao | G06F 11/201 438/257 |
| 2007/0165660 | A1 | 7/2007 | Fang | |
| 2010/0088469 | A1 * | 4/2010 | Motonaga | G06F 3/0613 711/113 |
| 2013/0283264 | A1 * | 10/2013 | Bhattacharya | G06F 9/45558 718/1 |
| 2014/0195731 | A1 * | 7/2014 | Rajasekaran | G06F 3/0617 711/112 |

* cited by examiner

*Primary Examiner* — Raymond Phan

(57) ABSTRACT

Methods and structure for emulating wide ports at an expander are provided. An exemplary system includes a Serial Attached Small Computer System Interface (SAS) expander. The expander includes a plurality of physical links, and a controller. The controller is able to identify a physical link coupled with a device, to generate a plurality of virtual physical links that are configured as a virtual wide port coupled with the device, and to present the virtual wide port at the expander in place of the physical link.

20 Claims, 5 Drawing Sheets

WIDE PORT EMULATION AT SERIAL ATTACHED SCSI EXPANDERS USING VIRTUAL PHYSICAL LINKS

FIELD OF THE INVENTION

The invention relates generally to Small Computer System Interface (SCSI) systems, and more specifically to expanders for Serial Attached SCSI (SAS) systems.

BACKGROUND

SAS expanders help to set up and tear down temporary connections between initiator devices and target devices in a SAS architecture. SAS expanders include multiple physical links (PHYs) that facilitate communications between different external devices. Specifically, switching circuitry within an expander can establish point-to-point connections between internal PHYs of the expander, and these connections allow external devices that are coupled to the PHYs of the expander to exchange data with each other.

SUMMARY

Systems and methods herein provide for SAS expanders that represent a PHY as a wide port. Thus, a single physical PHY of the expander appears to be multiple virtual PHYs. This can, for example, allow an initiator connected to the expander to increase the bandwidth used when communicating with a target device.

One exemplary embodiment is a Serial Attached Small Computer System Interface (SAS) expander. The expander includes a plurality of physical links, and a controller. The controller is able to identify a physical link coupled with a device, to generate a plurality of virtual physical links that are configured as a virtual wide port coupled with the device, and to present the virtual wide port at the expander in place of the physical link.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
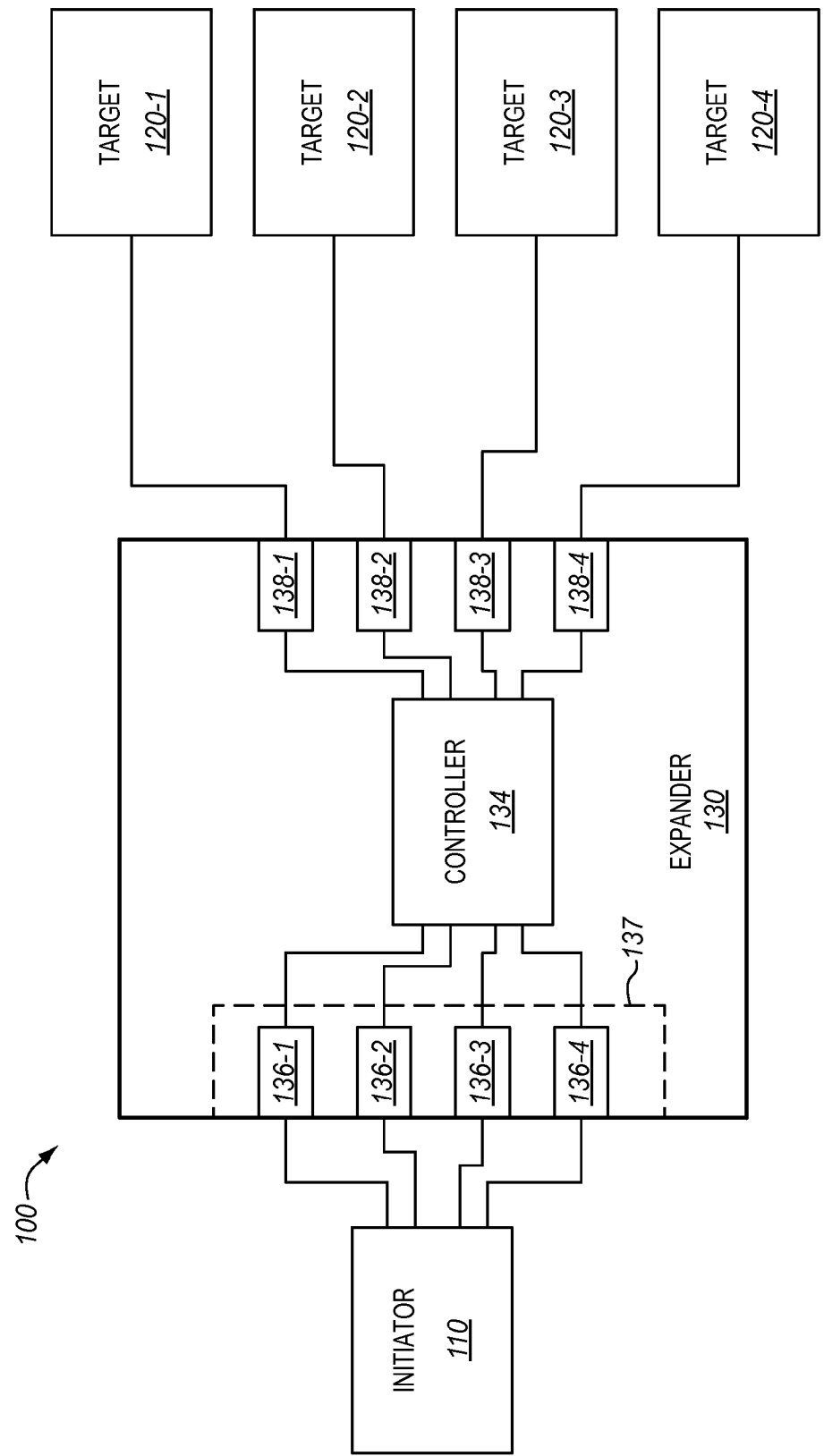
FIG. 1 is a block diagram of an exemplary SAS architecture.

FIG. 1 is a block diagram of an exemplary SAS architecture 100. SAS architecture 100 establishes connections between initiators and targets (known collectively as "end devices") in order to carry Input/Output (I/O) operations between those devices. In this embodiment, SAS architecture 100 includes SAS initiator 110, which is coupled via expander 130 to targets 120. SAS architecture 100 exhibits a benefit over prior systems because SAS expander 130 can represent a physical PHY as a wide port made up of many virtual PHYs. External SAS devices can therefore utilize the physical PHY as a wide port (e.g., by opening, via the virtual PHYs, multiple substantially concurrent SAS connections). This in turn allows the physical PHY to achieve a much larger bandwidth when transferring data than the physical PHY would otherwise receive via a single SAS connection.

SAS expander 130 comprises any suitable device capable of establishing point-to-point connections between end devices in accordance with SAS protocols. Specifically, expander 130 includes multiple different ports (e.g., wide ports and/or narrow ports) that each can be coupled with a different SAS device. Expander 130 establishes connections between end devices by electrically coupling different pairs of PHYs. Controller 134 manages the operations of SAS expander 130, and may comprise custom circuitry, a processor executing programmed instructions stored in program memory, or some combination thereof. For example, controller 134 may include a processor, an Expander Connection Router (ECR), an Expander Connection Manager (ECM), and/or other components.

Expander 130 includes wide port 137 formed by physical links (PHYs) 136-1 through 136-4. Via PHYs 136 of wide port 137, initiator 110 communicates with other elements of SAS architecture 100. A wide port allows initiator 110 to use multiple PHYs to service multiple independent connections with another device, which in turn enhances the amount of bandwidth that initiator 110 can use to transmit data. For example, in one embodiment initiator 110 uses a wide port having four 12 gigabit per second (Gbps) physical PHYs 136, providing an overall throughput of 48 Gbps when servicing four simultaneous SAS connections with a target device through expander 130.

In order to facilitate communications between wide port 137 and physical PHYs 138-1 through 138-4, controller 134 represents each PHY 138 as a virtual wide port made up of multiple virtual PHYs (not shown). Thus, initiator 110 may experience wide port sized data transfer rates (e.g., a rate of 48 Gbps) with a target device 120 when communicating with a target device 120, even if a target device 120 is only connected to expander 130 with one PHY (e.g., a 3 Gbps PHY). This is possible because initiator 110 views a single PHY 138 as an entire set of PHYs that operate as a wide port. For example, controller 134 may represent a PHY 138 as a set of virtual PHYs equal in number to the number of PHYs 136 that form wide port 137. As used herein, the term "PHY" when used alone refers to a physical PHY (e.g., circuitry), while the term "virtual PHY" refers to a logical representation of a PHY (e.g., an entry in a duplicated version of "attached device information" provided when IDENTIFY frames are exchanged). Similarly, a "wide port"

refers to a set of PHYs that constitute a SAS wide port, whereas a "virtual wide port" refers to an emulated representation of a wide port within SAS architecture 100.

SAS initiators 110 comprise any suitable initiator devices or components that are compliant with Serial Attached Small Computer System Interface (SAS) protocols such as Serial SCSI Protocol (SSP), SATA Tunneling Protocol (STP), Serial Management Protocol (SMP), etc. For example, in one embodiment SAS initiators 110 comprise Host Bus Adapters (HBAs) that utilize SSP to communicate with other end devices. Target devices 120-1 through 120-4 comprise any SAS and/or Serial Advanced Technology Attachment (SATA) compliant target devices, such as storage devices (e.g., disk drives, etc.).

In some embodiments, a single PHY 138 for a target device 120 is unable to match the bandwidth of wide port 137. In such cases, Store and Forward (SnF) modules (e.g., circuitry components that utilize End Device Frame Buffering (EDFB) technology) may be used to buffer data for transmission to a target 120 or to initiator 110. For example, in one embodiment each SnF circuit within controller 134 is switchably controlled to buffer incoming/outgoing data between a virtual PHY and a corresponding PHY 136 of wide port 137. Controller 134 then coordinates the operations of each SnF circuit so that PHY 138 receives data for each connection in the proper order from each of the virtual PHYs.

The particular arrangement, number, and configuration of components described herein is exemplary and non-limiting.

Figure 2:
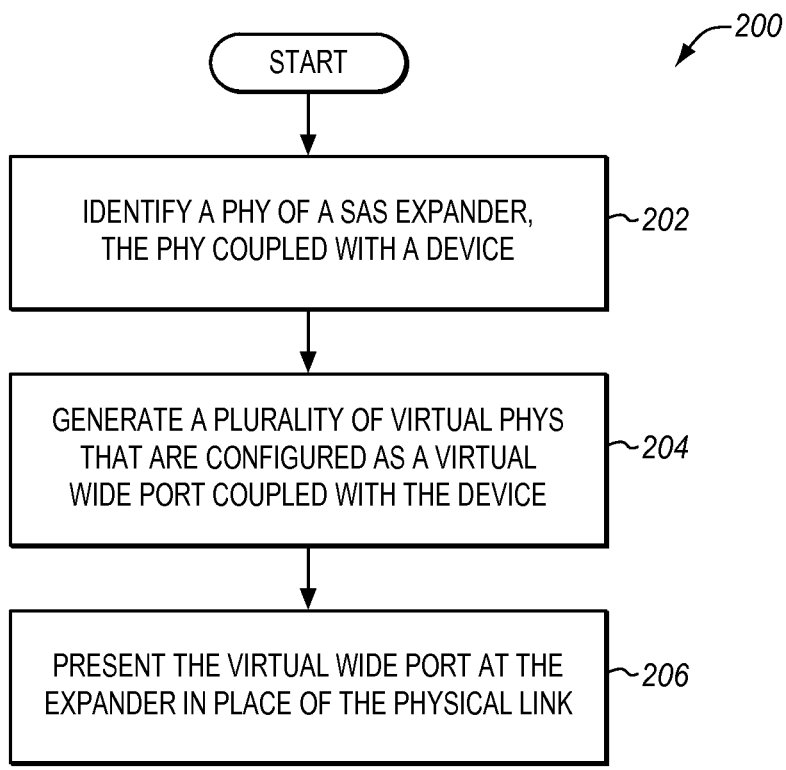
FIG. 2 is a flowchart describing an exemplary method of operating a SAS expander.

FIG. 2 is a flowchart describing an exemplary method 200 of operating a SAS expander. In step 202, controller 134 of expander 130 identifies an internal PHY of expander 130 (e.g., PHY 138-1) that is coupled with an end device. For example, in one embodiment step 202 is performed during the SAS discovery process, by identifying a PHY 138 that operates as a narrow port and is coupled with a SAS target device 120.

In step 204, controller 134 generates a plurality of virtual PHYs that are configured as a virtual wide port coupled with the device. In one embodiment, to generate the virtual PHYs, controller 134 modifies an attached device link information table stored in memory on expander 130. For example, controller 134 may perform this operation by adding multiple new entries in the table that each correspond to a virtual PHY, and removing/obscuring the original entry for the physical PHY 138.

In step 206, controller 134 presents the virtual wide port in place of the PHY 138. In one embodiment, controller 134 presents one or more virtual PHYs of the wide port by replicating and modifying IDENTIFY information for the PHY 138. The replicated IDENTIFY information may be assigned to a newly numbered logical/virtual PHY, and may further be added to the attached device information table. In one embodiment, controller 134 also stores the state of each virtual PHY (this information is used by an Expander Connection Manager (ECM) to determine PHY states). Controller 134 may further use SMP DISCOVER responses to return the attached device information for each logical/virtual PHY. By inheriting IDENTIFY information from the physical PHY, each newly defined virtual PHY can use information stored for the physical PHY, such as the attached SAS address of the physical PHY.

Using method 200 above, the devices of SAS architecture 100 can establish communications with the identified PHY 138 and treat the PHY as a wide port, which in turn means that the devices can transmit data to the PHY 138 at a much faster rate than SAS standards would normally allow. Even though the steps of method 200 are described with reference to expander 130 of FIG. 1, method 200 can be performed in other expanders. The steps of the flowcharts described herein are not all inclusive and can include other steps not shown. The steps described herein can also be performed in an alternative order.

In a further embodiment, when a new SAS connection is established between a PHY of wide port 137 and a virtual PHY of a virtual wide port for a PHY 138, incoming data from wide port 137 is routed to a Store and Forward (SnF) module (e.g., circuitry components), which each buffer the data for a connection with a virtual PHY. Once the data has been transmitted to the virtual wide port, wide port 137 closes the connections with each of the virtual PHYs and may establish a new connection. Meanwhile, the remaining buffered data for the closed connection is transmitted from the SnF modules over time to the PHY 138.

The above technique provides wide port 137 with greater apparent bandwidth when connected with PHY 138. Thus, wide port 137 does not spend as much time connected to the virtual wide port (e.g., at 48 Gbps) as it would spend being connected directly to the PHY 138. (e.g., at 12 Gbps). As such, wide port 137 can move on to service other connections with other PHYs of expander 130, while the SnF modules continue to trickle buffered data to the PHY 138.

In a similar fashion, outgoing data can be sent over time from the PHY 138 upstream to the multiple SnF modules. The SnF modules can then transmit the buffered data to wide port 137 via the virtual wide port. In effect, this means that data from PHY 138 can be stored up over time at a slower rate (e.g., at 12 Gbps), and then transmitted at a substantial rate (e.g., at 48 Gbps) to wide port 137 once SAS connections with wide port 137 have been established. Again, this increase in connection bandwidth allows wide port 137 to spend less time servicing SAS connections with the PHY 138, which provides wide port 137 more time to service SAS connections with other PHYs of expander 130.

Examples

In the following examples, additional processes, systems, and methods are described in the context of a SAS expander capable of emulating a wide port.

Figure 3:
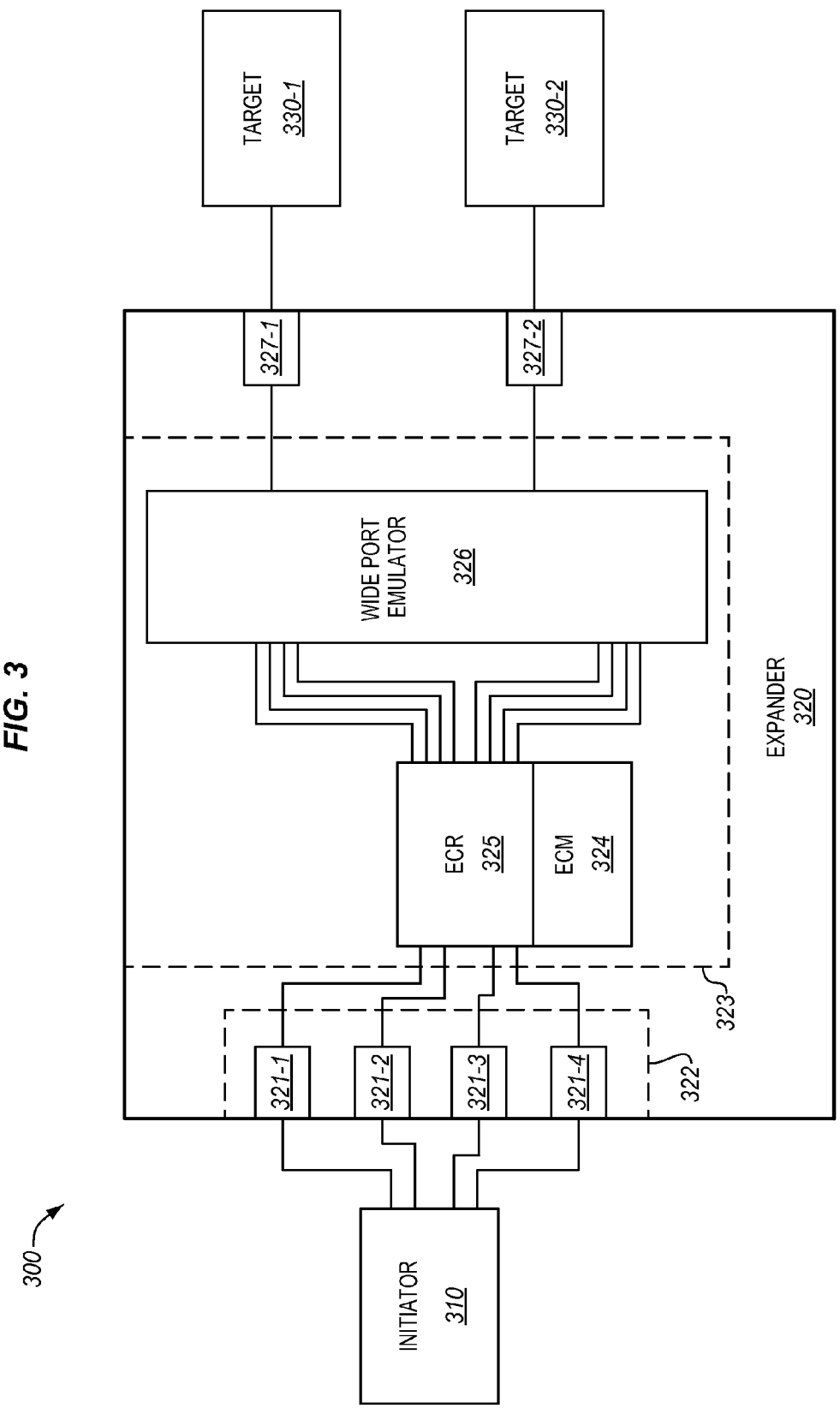
FIG. 3 is a block diagram illustrating an additional exemplary SAS architecture.

FIG. 3 is a block diagram illustrating an additional exemplary SAS architecture 300. In this example, SAS architecture 300 includes SAS initiator 310, which is coupled with SAS expander 320 via multiple physical PHYs 321 that form wide port 322 at expander 320. In this embodiment, SAS expander 320 includes controller 323, which includes ECM 324, ECR 325, and Wide Port Emulator 326. SAS Expander Connection Manager (ECM) 324 programs SAS Expander Connection Router (ECR) 325 in order to form connections between PHYs 321-1 through 321-4 of wide port 322, and virtual PHYs represented by wide port emulator 326. In this example, wide port emulator 326 identifies physical PHYs 327 that are coupled to SAS targets 330-1 through 330-2, and for each PHY 327, wide port emulator generates a virtual wide port. In this example, since wide port 322 includes four physical PHYs, wide port emulator 326 emulates each PHY 327 as a virtual wide port composed of four virtual PHYs.

Each virtual PHY in this example can be identified separately in one or more DISCOVER responses sent by expander 320 (e.g., at byte 43: bit 7 of a DISCOVER response). During transfer of data for a SAS connection, a crossbar of ECR 325 does the actual transmission of data between two PHYs. ECM 324 configures ECR 325 by selecting a pair of PHYs for actual data forwarding.

In this embodiment, instead of one ECR, there are three ECRs (Expander ECR crossbar 325, upstream ECR crossbar 430 of FIG. 4, and downstream ECR crossbar 460 of FIG. 4) which are controlled through two different ECMs (324 and 440) as shown.

During a data transfer from the initiator to the target, data received on an upstream physical PHY (e.g., 321-4) for a given virtual PHY (for one PHY 412 of the various PHYs 412 that form the virtual wide port) will be routed through expander ECR 325 to upstream ECR crossbar 430 for further forwarding to a selected SnF module 450 where actual data will be buffered.

Data stored at the SnF module 450 is then forwarded through ECR crossbar 460 to a target physical PHY (e.g., PHY 327-1). A substantially reverse sequence of operations may be performed for data transfers from a target to an initiator.

Figure 4:
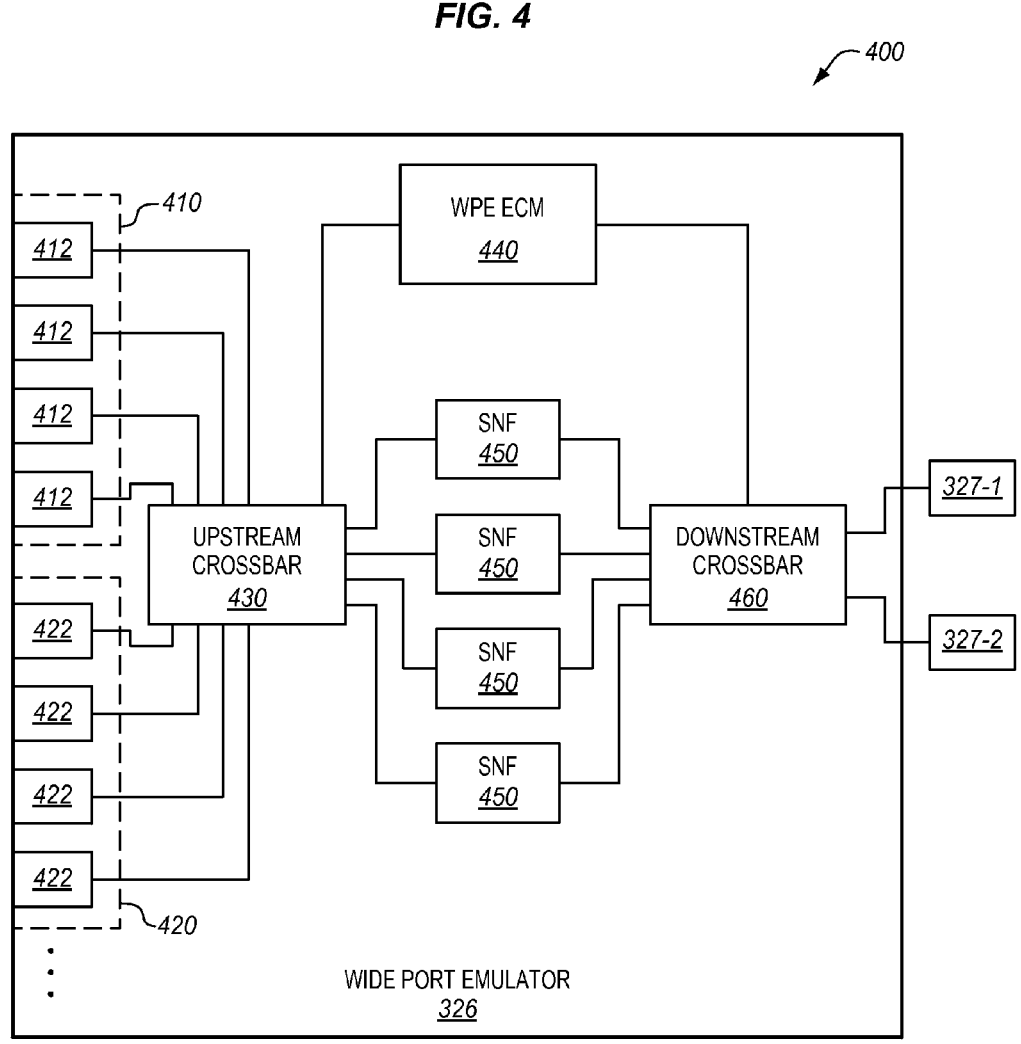
FIG. 4 is a block diagram illustrating an exemplary wide port emulator.

In short, in this example a virtual PHY is represented by attached device information, and the PHY status of this virtual PHY (as well as connection request processing) can be controlled by WPE ECM 440 of FIG. 4. Data transfer to a virtual PHY (e.g, a virtual PHY 412 or 422) is accomplished using SnF modules 450 with the help of ECR crossbars 430 and 460.

While only six PHYs of expander 320 are shown, expander 320 can include a larger or smaller number of PHYs. Similarly, while wide port 322 is shown as including four PHYs, a greater or smaller number of PHYs may be used to implement wide port 322 as a matter of design choice.

Assume, for this example, that wide port emulator 326 can service a connection to a virtual wide port for a first SAS target 330, then close the connection and establish a new connection with a different virtual wide port for a different SAS target 330.

FIG. 4 is a block diagram 400 illustrating an exemplary wide port emulator 326. According to FIG. 4, wide port emulator 326 includes multiple virtual PHYs 412 that form virtual wide port 410 for one target device 330, as well as multiple virtual PHYs 422 that form virtual wide port 420 for another target device 330. As explained above, SnF modules 450 buffer the actual data for a virtual PHY routed through an ECR before forwarding the data to a destination device.

Incoming data directed to a virtual PHY is received at upstream crossbar 430 (e.g., circuitry), which routes the data to an SnF module 450 for storage and transmission. Since the number of SnF modules is equal to the number of PHYs in wide port 322, the SnF modules can each buffer data for a PHY 321.

Downstream crossbar 460 (e.g., circuitry) serves to route data between SnF modules 450 and a PHY 327 (i.e., a "real, physical" PHY). Wide Port Emulator (WPE) Expander Connection Manager (ECM) 440 programs upstream crossbar 430 and downstream crossbar 460 in order to establish connections between the various PHYs, SnF modules, and virtual PHYs. For example, to ensure that data is received at PHY 327 in the correct order, WPE ECM 440 may track the data sent to SnF modules 450, and may program downstream crossbar 460 to set up and tear down connections dynamically between SnF modules 450 and a PHY 327.

Figure 5:
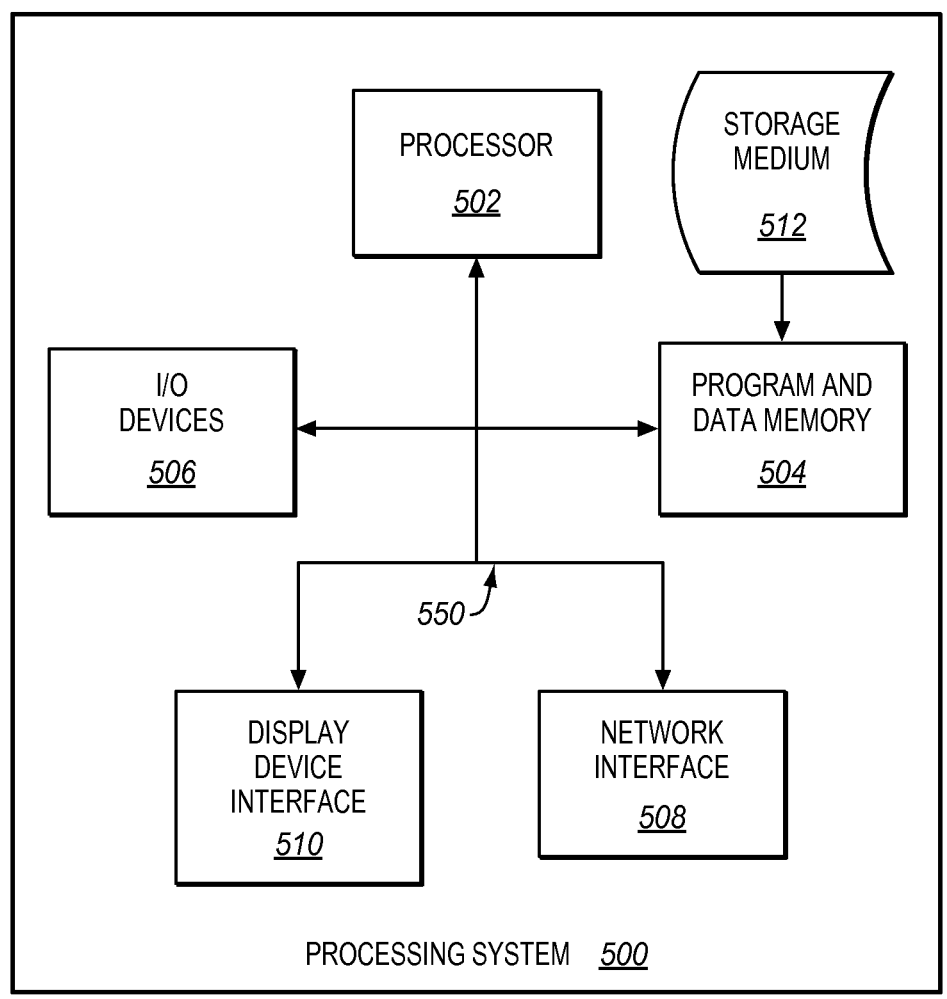
FIG. 5 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of an expander to perform the various operations disclosed herein. FIG. 5 illustrates an exemplary processing system 500 operable to execute a computer readable medium embodying programmed instructions. Processing system 500 is operable to perform the above operations by executing programmed instructions tangibly embodied on computer readable storage medium 512. In this regard, embodiments of the invention can take the form of a computer program accessible via computer readable medium 512 providing program code for use by a computer (e.g., processing system 500) or any other instruction execution system. For the purposes of this description, computer readable storage medium 512 can be anything that can contain or store the program for use by the computer (e.g., processing system 500).

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 can also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 510 can be integrated with the system to interface to one or more display devices, such as printing systems and screens for presentation of data generated by processor 502.

What is claimed is:

1. A system comprising:
a Serial Attached Small Computer System Interface (SAS) expander, comprising,
a plurality of physical links, and
a controller operable to identify a physical link in the plurality of physical links that is coupled with a first device, to generate a plurality of virtual physical links that are configured as a first wide port coupled with the first device, and to present the first wide port at the SAS expander in place of the physical link such that the physical link is represented as multiple physical links to a second wide port of the SAS expander, the second wide port being a subset of physical links in the plurality of physical links that allow for a second device to service multiple simultaneous connections with the first device.

2. The system of claim 1, wherein:
the controller is further operable to manage the first wide port to service a Serial Attached Small Computer System Interface connection with the second wide port of the SAS expander.

3. The system of claim 1, wherein:
the controller is further operable to alter an expander route table of the SAS expander to replace an entry for the physical link with an entry for each virtual physical link.

4. The system of claim 1, wherein:
the controller is further operable to present the first wide port at the SAS expander in place of the physical link during Serial Attached Small Computer System Interface discovery.

5. The system of claim 1, wherein:
the controller is further operable to acquire data directed to the first wide port, and to forward the data to the physical link.

6. The system of claim 1, wherein:
the controller comprises:
an expander connection router operable to carry data between the subset of physical links of the second wide port and the plurality of virtual physical links of the first wide port;
an expander connection manager operable to program the expander connection router to establish connections between the subset of physical links of the second wide port and the plurality of virtual physical links of the first wide port.

7. The system of claim 1, wherein the second wide port allows for the second device to service the multiple simultaneous connections with the first device at a total throughput that is greater than any one of the physical links in the subset of physical links.

8. The system of claim 1, wherein the controller is further operable to buffer data directed to the first wide port, thereby accounting for differences in bandwidth between the first wide port and the physical link.

9. The system of claim 1, wherein the controller is operable to present the first wide port at the SAS expander in place of the physical link by replicating and modifying IDENTIFY information for the physical link.

10. The system of claim 5, wherein:
the controller is further operable to buffer data directed to the first wide port, thereby accounting for differences in bandwidth between the first wide port and the physical link.

11. The system of claim 7, wherein the total throughput is a sum of throughputs of each of the physical links in the subset of physical links.

12. The system of claim 10, wherein:
the controller comprises multiple store-and-forward modules that buffer the data for the first wide port, wherein the number of store-and-forward modules corresponds to the number of virtual physical links that form the first wide port.

13. The system of claim 12, wherein:
the controller is further operable to direct each store-and-forward module to buffer data sent to a different virtual physical link of the first wide port, when servicing a Serial Attached Small Computer System Interface connection for the first wide port.

14. A system comprising:
a Serial Attached Small Computer System Interface (SAS) expander, comprising,
a plurality of physical links, and
a controller operable to identify a physical link in the physical links that is coupled with a device, to generate a plurality of virtual physical links that are configured as a virtual wide port coupled with the device, and to present the virtual wide port at the SAS expander in place of the physical link, wherein the controller comprises a wide port emulator, comprising,
multiple store-and-forward modules that are each operable to buffer incoming data received at a virtual physical link in the plurality of virtual physical links,
an upstream expander connection router operable to map the plurality of virtual physical links to the multiple store-and-forward modules,
a downstream expander connection router operable to map the multiple store-and-forward modules to the physical link.

15. A method comprising:
identifying a physical link of a Serial Attached Small Computer System Interface (SAS) expander, wherein the physical link is coupled with a device;
generating a plurality of virtual physical links that are configured as a virtual wide port coupled with the device;
presenting the virtual wide port at the SAS expander in place of the physical link;
receiving a request to establish a connection between a wide port and the virtual wide port;
establishing the requested connection between the wide port and the virtual wide port by programming an expander connection manager to couple physical links of the wide port with the virtual physical links of the virtual wide port; and
buffering data for the virtual wide port, thereby accounting for differences in bandwidth between the virtual wide port and the physical link.

16. The method of claim 15, further comprising:
operating multiple store-and-forward modules to buffer the data for the virtual wide port, wherein the number of store-and-forward modules corresponds to the number of virtual physical links of the virtual wide port.

17. The method of claim 15, further comprising:
presenting the virtual wide port at the SAS expander in place of the physical link during Serial Attached Small Computer System Interface discovery.

18. The method of claim 15, further comprising:
altering an expander route table of the SAS expander to replace an entry for the physical link with an entry for each virtual physical link.

19. The method of claim 15, further comprising:
mapping the virtual physical links to individual store-and-forward modules of the SAS expander;
buffering, via a store-and-forward module, incoming data received at a virtual physical link; and
mapping store-and-forward modules to the physical link.

20. A Serial Attached Small Computer System Interface (SAS) expander, comprising:
physical links; and
a controller operable to,
represent a physical link in the physical links as multiple virtual physical links that are coupled to one device to form a virtual wide port,
acquire data directed to the virtual wide port,
buffer the data directed to the virtual wide port, thereby accounting for differences in bandwidth between the virtual wide port and the physical link, and
forward the buffered data to the physical link.

* * * * *